United States Patent
Figge et al.

(10) Patent No.: US 11,754,103 B2
(45) Date of Patent: Sep. 12, 2023

(54) TOLERANCE COMPENSATION ASSEMBLY

(71) Applicant: BÖLLHOFF VERBINDUNGSTECHNIK GmbH, Bielefeld (DE)

(72) Inventors: Hans-Ulrich Figge, Schloß Holte-Stukenbrock (DE); Wolfgang Hesse, Rietberg (DE); Thorsten Stallmann, Löhne (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 552 days.

(21) Appl. No.: 16/758,498

(22) PCT Filed: Sep. 26, 2018

(86) PCT No.: PCT/EP2018/076082
§ 371 (c)(1),
(2) Date: Apr. 23, 2020

(87) PCT Pub. No.: WO2019/081149
PCT Pub. Date: May 2, 2019

(65) Prior Publication Data
US 2020/0248733 A1    Aug. 6, 2020

(30) Foreign Application Priority Data
Oct. 24, 2017  (DE) .......................... 102017124809.9

(51) Int. Cl.
*F16B 5/02*    (2006.01)
*F16B 37/04*   (2006.01)
*F16B 37/08*   (2006.01)

(52) U.S. Cl.
CPC ............ *F16B 5/0233* (2013.01); *F16B 5/025* (2013.01); *F16B 5/0225* (2013.01); *F16B 5/0283* (2013.01);
(Continued)

(58) Field of Classification Search
CPC ..................................................... F16B 5/0233
(Continued)

(56) References Cited

U.S. PATENT DOCUMENTS 5,288,191 A * 2/1994 Ruckert ................ F16B 5/0233
                                                      411/432
7,195,436 B1   3/2007 Stephen
(Continued)

FOREIGN PATENT DOCUMENTS

CN    101033767 A    9/2007
CN    101135331 A    3/2008
(Continued)

OTHER PUBLICATIONS

Written Opinion & International Search Report for PCT/EP2018/076082 dated Dec. 14, 2018, 18 pages.

*Primary Examiner* — Flemming Saether
(74) *Attorney, Agent, or Firm* — Reising Ethington P.C.

(57) ABSTRACT

A tolerance compensation arrangement for fastening first and second components with compensation of tolerances between the components. The arrangement comprises a base element having a first element with a first inner thread, a second element with a second inner thread, a supporting element arranged in between, and an adjustment unit with a threaded sleeve with an outer thread and a dragging unit at least partially arranged in the sleeve. The outer thread forms a first thread pairing of a first thread direction with the first inner thread. A fastening screw, can be screwed into the second inner thread via a second thread pairing of a second thread direction opposite to the first thread direction. The fastening screw can be connected to the adjustment unit via the dragging unit so that, during the rotation of the fastening screw, the adjustment unit co-rotates and is moved into abutment with the first component.

18 Claims, 6 Drawing Sheets

(52) U.S. Cl.
CPC ......... *F16B 37/044* (2013.01); *F16B 37/0807* (2013.01)

(58) Field of Classification Search
USPC ........................................................ 411/546
See application file for complete search history.

(56) References Cited

U.S. PATENT DOCUMENTS

| | | | |
|---|---|---|---|
| 7,488,135 B2 * | 2/2009 | Hasegawa | F16B 5/0233 403/22 |
| 7,891,927 B2 | 2/2011 | Burger et al. | |
| 8,066,465 B2 | 11/2011 | Figge et al. | |
| 8,202,033 B2 | 6/2012 | Choi et al. | |
| 8,794,889 B2 | 8/2014 | Aukzemas et al. | |
| 8,864,432 B2 | 10/2014 | Figge et al. | |
| 9,074,614 B2 | 7/2015 | Schwarzbich | |
| 9,359,012 B2 * | 6/2016 | Yao | F16B 5/0233 |
| 9,464,659 B2 | 10/2016 | Schwarzbich | |
| 9,605,699 B2 * | 3/2017 | Schmidt | F16B 5/04 |
| 2006/0226312 A1 * | 10/2006 | Masuch | F16B 5/0233 248/188 |
| 2006/0280579 A1 * | 12/2006 | Seidl | F16B 5/0233 411/546 |
| 2007/0207012 A1 | 9/2007 | Lorenzo | |
| 2017/0276165 A1 * | 9/2017 | Matsunami | B25B 13/48 |
| 2020/0240459 A1 * | 7/2020 | Figge | F16B 5/0233 |

FOREIGN PATENT DOCUMENTS

| | | |
|---|---|---|
| CN | 102138011 A | 7/2011 |
| CN | 208702877 U | 4/2019 |
| DE | 10300991 A1 | 7/2004 |
| DE | 10350957 A1 | 5/2005 |
| DE | 202005016823 U1 | 2/2006 |
| DE | 102004050939 A1 | 4/2006 |
| DE | 102007037242 A1 | 2/2008 |
| DE | 202008011318 U1 | 11/2008 |
| DE | 102007032242 A1 | 1/2009 |
| DE | 102009044635 A1 | 12/2010 |
| DE | 102012110352 A1 | 5/2013 |
| DE | 202012102440 U1 | 10/2013 |
| DE | 102013216716 A1 | 2/2015 |
| WO | 2007008372 A1 | 1/2007 |
| WO | WO2010022841 A1 | 3/2010 |

* cited by examiner

TOLERANCE COMPENSATION ASSEMBLY

1. TECHNICAL FIELD

The present disclosure is related to a tolerance compensation arrangement for fastening a first component to a second component with automatic or self-acting compensation of tolerances in the spacing between the first and the second component. Additionally, the present disclosure is related to a first component in combination with a tolerance compensation arrangement, a first and a second component, which are fastened to each other via a tolerance compensation arrangement by means of a screw, a manufacturing method for a base element of a tolerance compensation arrangement as well as a manufacturing method for a tolerance compensation arrangement.

2. BACKGROUND

Tolerance compensation arrangements are known in a wide variety. They are typically composed of an adjustment bushing having a so-called dragging section that can form a frictional connection to a fastening screw. When rotating the fastening screw, therefore, the adjustment bushing is also rotated until it rests at one of the two components, whereupon during further rotation of the fastening screw and with corresponding increase of the torque the frictional connection is overcome, so that the two components can be clamped together by the fastening screw via the adjustment bushing.

DE 20 2012 102 440 U1 describes a tolerance compensation element with at least two supporting bodies, which are in such a manner thread-engaged with each other, that the axial dimension of the tolerance compensation element is adjustable by relatively turning the supporting bodies. At least one of the supporting bodies comprises a coil spring, which is wound from a wire with non-rectangular cross-section and forms the thread of this supporting body. The tolerance compensation element is retained by means of claws in a component, which comprises a threaded bore for engagement with a fastening screw.

Another tolerance compensation element is described in DE 10 2012 110 352 A1. This tolerance compensation element includes at least two supporting bodies, from which at least one comprises a helically-shaped supporting plane, over which the supporting bodies support each other in such a manner that the axial dimension of the tolerance compensation element is adjustable by relatively turning the supporting bodies. At least one of the supporting bodies is a coil spring and the supporting body being supported thereby comprises a web, which engages between the windings of the coil spring. Here, again, the tolerance compensation element is fastened by means of claws in the component, wherein the component comprises a threaded bore for engagement with a fastening screw.

A further tolerance compensation arrangement is described in DE 10 2013 216 716 A1. Here, the tolerance compensation arrangement comprises a base element, which defines an axial direction, a compensating element, which is movable relatively to the base element for compensating tolerances between the components to be connected, and a securing means for securing the compensating element against a movement relative to the base element. The securing means is releasable independently from a movement of the compensating element relatively to the base element.

A fastening arrangement with tolerance compensation in longitudinal direction is described in DE 10 2004 050 939 A1. In the fastening arrangement, a soft component for acoustic decoupling is provided.

A further fastening arrangement with tolerance compensation is described in DE 10 2007 037 242 A1. The fastening arrangement comprises a base unit, which consists of a blind rivet nut which may be secured to the first component, an adjusting thread nut and a sleeve-shaped retainer which receives the adjusting thread nut and connects said adjusting thread nut to the blind rivet nut. Further, the fastening arrangement comprises an adjustment unit, which consists of a threaded sleeve, an installation plate and a driving bush, which connects the threaded sleeve and the installation plate. The threaded sleeve of the adjustment unit is being able to be screwed into the adjusting thread nut of the base unit via a first thread pairing of a first thread direction. A fastening screw is being able to be screwed into the blind rivet nut secured to the component via a second thread pairing of an opposing second thread direction. The fastening screw forms with the driving bush a releasable dragging connection in order to rotate the adjustment unit during rotation of the fastening screw and thereby to move the installation plate into abutment with the component for the purpose of tolerance compensation.

A disadvantage of these arrangements is that the dragging section is not mounted in a floating manner. Thus, a misalignment of the fastening screw while inserting into the adjustment element cannot be compensated. These tolerance compensation arrangements require, therefore, a high degree of precision during use.

Finally, a fastening arrangement with tolerance compensation is described in WO 2010/022841 A1. The arrangement comprises a receiving element and an adjustment element which can be screwed to the receiving element via a first thread pairing having a first thread direction. A fastening screw can be inserted through an opening in the receiving element and adjustment element which can be screwed into the receiving element via a second thread pairing having a second thread direction opposite to the first thread direction and can be connected to the adjustment element by a releasable dragging connection. In this way, the adjustment element co-rotates during the rotation of the fastening screw and thereby abuts with the second component. The adjustment element comprises a dragging element which is arranged in a rotationally fixed and floating manner inside a thread element, thus making it possible to compensate for a misalignment of the fastening screw during insertion into the adjustment element.

A disadvantage of the tolerance compensation arrangement with floating dragging element is that the tolerance compensation arrangement is made of plastic. As a consequence, the flux of the pre-tension force applied via the fastening screw solely flows through plastic components when using this tolerance compensation arrangement. In the range of low forces, such a connection is sufficient. If, however, higher forces of the connection should be realized via the tolerance compensation arrangement, then the plastic flows or deforms and the pre-tension force introduced in the tolerance compensation arrangement gets lost.

Thus, the object of at least some implementations of the present invention is to provide an alternative construction of a tolerance compensation arrangement which is optimized with regard to the tolerance compensation arrangements known in the prior art, especially with regard of the strengths realized thereby while at the same time ensuring a wide as possible range of application.

3. SUMMARY

The above object is solved by a tolerance compensation arrangement for fastening a first component to a second component with automatic compensation of tolerances in the spacing between the first and the second component, a first component in combination with a tolerance compensation arrangement, a first and a second component, which are fastened to each other via a tolerance compensation arrangement by means of a fastening screw, a manufacturing method for a base element of the tolerance compensation arrangement as well as a manufacturing method for a tolerance compensation arrangement. Further embodiments and developments arise from the following description, the drawings and the appending claims.

According to the disclosure, a tolerance compensation arrangement for fastening a first component to a second component with automatic compensation of tolerances in the spacing between the first component and the second component comprises the following features: a base element which comprises a first metal element with a first inner thread and a second metal element with a second inner thread as well as a supporting element may be made of metal and arranged between the first and the second metal element, wherein the first and the second metal element may be spaced from each other along a longitudinal axis of the base element and an adjustment unit which comprises a threaded sleeve made of metal with an outer thread and a dragging unit at least partially arranged in the threaded sleeve, wherein the outer thread forms a first thread pairing of a first thread direction with the first inner thread of the first metal element of the base element, while a fastening screw, which is insertable through an opening of the base unit and the adjustment unit, can be screwed in the second inner thread of the second metal element of the base element via a second thread pairing of a second thread direction opposite to the first thread direction and can be connected to the adjustment unit via the dragging unit through a releasable dragging connection so that, during the rotation of the fastening screw, the adjustment unit co-rotates and is moved thereby into abutment with the first component.

In the following, the tolerance compensation element is illustrated by its use. It is assumed that the tolerance compensation element is already fastened in a first component. Such a fastening may take place via an outer thread of the base element. For example, the base element comprises for this purpose in a middle section between a first axial end and a second axial end a basically circular-shaped outer form with an outer thread. By means of this outer thread, the base element can thus be screwed in a corresponding circular opening in the first component.

A second component is arranged over the first component, wherein an opening in the second component may be oriented with the opening in the first component. A fastening screw is guided through the opening in the second component for the fastening of the second component and engages with the dragging unit of the adjustment unit. The fastening screw forms with the dragging unit a releasable dragging connection in order to rotate the adjustment unit during rotation of the fastening screw and thereby to move the dragging unit into abutment with the second component for the purpose of tolerance compensation. Upon further rotation of the fastening screw and with corresponding increase of the torque the dragging connection is overcome and the fastening screw engages with the second metal element, so that the two components can then be clamped together by the fastening screw via the adjustment unit.

The base element, which may consist of plastic, forms together with the first metal element, the second metal element and the supporting element the so-called base unit. Thus, the base unit consists of four parts. The two metal elements and the supporting element are in contact with each other, wherein the second metal element and the supporting element may be overmolded or embedded by the plastic of the base element. Also, more than one supporting element can be used. It may be preferred, however, that for the later manufacturing of the tolerance compensation arrangement not more than two individual components are present, particularly the first metal element and the base element with the second metal element and the supporting element. In an alternative embodiment, the first metal element is also overmolded or embedded by the plastic of the base element. The first metal element, the second metal element and/or the supporting element may consist of the same metal, for example steel. It is important that, regardless whether the first and/or second metal element are overmolded or not, the first and the second metal element are arranged rotation-proof inside the base element, so that they do not co-rotate during a screwing in or screwing out of the threaded sleeve and the fastening screw. To this, the first and the second metal element may comprise a rotation-inhibiting outer contour, which, in collaboration with the corresponding inner contour of the base element, prevents the co-rotation of the first and second metal element. Such a rotation-inhibiting outer contour can be, for example, any angular or non-circular outer contour but also any round outer contour with a protrusion, which engages in a recess in the base element and thereby prevents a co-rotation. Also, the first and the second metal element may be a first and a second nut.

The first metal element acts together with the metal threaded sleeve of the adjustment unit and thereby forms the first thread pairing of the first thread direction. For example, the inner thread of the first metal element and the outer thread of the threaded sleeve each are a left-hand thread. The second metal element acts together with the fastening screw and thereby forms the second thread pairing of the second thread direction, the second thread direction is then defined by a right-hand thread with regard to the first thread direction defined by a left-hand thread.

Initially, an advantage of the tolerance compensation arrangement is that, when compared to a pure plastic tolerance compensation arrangement, greater strengths of the connection between the components to be connected are achievable. This is achieved especially due to the first and the second thread pairing made of metal, such as steel and the supporting element arranged in between. Due to this construction of the tolerance compensation arrangement, the force flux flows seamlessly through metal, so that with the tolerance compensation arrangement, higher forces compared to an arrangement without metal connection between the first and the second metal element can be realized. The plastic overmolding of especially the supporting element provides an additional stabilization of the supporting element during a force transmission to the supporting element.

By the preferred spacing between the first and the second metal element in the base element of the tolerance compensation arrangement, a larger scope of application is realizable, which is discussed further with reference to the certain embodiments. Compared to the known and above-described tolerance compensation arrangements, the scope of application is thus increased on the one hand, while at the same time higher strengths are achievable with the tolerance compensation arrangement and the tolerance compensation arrangement is manufacturable cost-effectively due to the combination of metal and plastic.

In a further embodiment, the base element surrounds the first and the second metal element at least partially in such a manner, that the first and the second metal element in the base element are arranged rotationally fixed, wherein the base element may consist of plastic. The rotationally fixed arrangement accordingly ensures that the threaded sleeve and thus the adjustment unit can move in direction to or from the second component and the fastening screw can be screwed in or out of the second metal element, without the need of another additional tool. In this way, with the screwing in of the threaded sleeve in the first metal element and the screwing in of the fastening screw in the second metal element, a stable metal-metal-connection is established, which can receive greater forces when compared to pure plastic-plastic-connections.

In a further embodiment, the first metal element is floatingly arranged in the base element, so that a misalignment of the fastening screw during the inserting of the adjustment unit can be compensated. Since the first metal element is floatingly arranged, the adjustment unit as a whole is floatingly arranged and able to perform radial or lateral compensation movements with regard to its longitudinal axis within the base element. With a corresponding design of the base element and the first metal element it is also possible that an angular compensation movement can be performed by the adjustment unit within the base element. Especially through this embodiment a large scope of application of the tolerance compensation arrangement is realizable, since the floating arrangement of the first metal element compensates misalignments of the fastening screw. At the same time, with the use of metal components, a greater strength of the connection is achievable by means of the tolerance compensation arrangement.

According to a further embodiment, the base element comprises a first end with a first inner diameter and an opposite second end with a second inner diameter being smaller than the first inner diameter and in at least some embodiments is preferably not larger than the inner diameter of the second metal element. The first metal element is arranged adjacent to the first end and the second metal element is arranged adjacent to the second end. In this way, the first and the second metal element are spaced from each other along a longitudinal axis of the base element. It may especially be preferred that the second metal element is designed self-lockingly. In an alternative embodiment, the second diameter range is arranged in screw-in direction of the fastening screw behind the second metal element. In this way, it is not necessary that the second metal element is designed self-lockingly, since the second diameter range represents a locking against self-releasing of the fastening screw.

It may further be preferred that the base element comprises a first lateral opening for the receiving of the first metal element. In an alternative embodiment, when only the supporting element was overmolded with plastic during the manufacturing of the base element, a second lateral opening for the receiving of the second metal element in the base element is provided. In this embodiment, the first and the second lateral opening may be arranged axially above of each other. In this way, the base element can initially be manufactured, for example by means of injection molding. Prior to the assembly of the adjustment unit, the first and/or the second metal element are then inserted or slid-in into the base element through the lateral openings. In a further embodiment, the first and/or the second metal element can be manufactured together with the base element, hence being embedded in the plastic, as already discussed above. Regarding the embodiment with the floating arrangement of the first metal element, an injection molding or over-molding of the first metal element is not provided. In the embodiment with floating arrangement, an inserting or slide-in is thus performed through the respective lateral opening.

In a further embodiment, the dragging unit comprises a dragging element, which may be made of plastic, as well as an abutting disc, which may be made of metal, wherein the dragging element is retained in the threaded sleeve by means of press-fit. Regarding the arrangement of the dragging unit by means of press-fit in the threaded sleeve, it is referred to the application DE 10 2007 037 242 A1. In a further embodiment, the dragging unit comprises a first and a second axial end, wherein the first axial end is arranged in alignment or flush with a first side of the abutting disc and a second side of the abutting disc opposite to the first abuts with the threaded sleeve. The first axial end for example comprises a first ring, which may have crushing segments for the fastening of the abutting disc. The upper side of the first ring, hence the side of the first ring opposite to the base element, is arranged flush with the first side of the abutting disc. Further, the dragging unit comprises a second ring, which is connected to the first ring via for example two dragging webs, which project springily radially inwardly and thereby tapering the passage for the fastening screw. In this way, the abutting disc is held in contact with the threaded sleeve via the dragging unit. In this case, the adjustment unit consists of the threaded sleeve made of metal, the dragging element, which may consist of plastic, and the abutting disc, which may also consist of metal.

It may also be preferred that the dragging element comprises a first radially outwardly protruding protrusion adjacent to the second axial end and the base element comprises a first radially inwardly protruding protrusion, which together form a counter-locking. The first protrusion of the dragging element is thereby especially arranged at the second ring of the dragging element. Due to the embodiment of the first metal element, the second metal element and the threaded sleeve made of metal, the corresponding inner or outer threads are manufactured by cutting. When compared to a plastic manufacturing, the providing of an end stop of the respective thread is thus not possible. In order to provide a counter-locking for preventing a countering of the threaded sleeve in the first metal element, the two protrusions acting together are provided. The two protrusions are dimensioned such that, when the adjustment unit is rotated back, the first protrusion of the dragging element safely fastens against the first protrusion of the base element with a sufficient covering. At the same time, the dimensioning is such that, when the adjustment unit is screwed out after a rotation, the first protrusion of the dragging element can pass the first protrusion of the base element contact-free. At the manufacturing of the tolerance compensation arrangement, a correctly positioned assembly of the adjustment unit or the dragging element is especially important, which is later discussed in more detail.

In a further embodiment, the dragging element comprises at least a second radially outwardly protrusion adjacent to the second axial end, and the base element comprises at least one aperture or recess, which together form a transport locking, especially against rotating. The second radial protrusion may be arranged at a third ring of the dragging element. The third ring is connected to the second ring at the side facing away from the first ring such as by webs. In the completely screwed-in condition of the adjustment unit into the base element, the second protrusion of the dragging element is in engagement with the at least one aperture or the at least one recess of the base element. This may be the condition in which the first protrusion of the dragging element is in engagement with the first protrusion of the base element, thus the counter-locking is effective. To this end, it is advantageous when the first radial protrusion of the dragging element for the counter locking may be displaced with respect to the second radial protrusion for forming the transport locking. For example, the transport locking can be formed by two second radial protrusions on the adjustment element being opposite to each other. The first radial end stop can be arranged between these two, for example at an angle of 90°. Especially in view of the embodiment of the transport locking, it is referred to WO 2010/022841 A1. It may be preferred that the third ring has an oval shape, so that, when the fastening screw is driven through, at least one second radially outwardly protruding protrusion of the dragging element is unlockable by a radially inwardly directed deformation movement.

In another embodiment, the dragging element comprises at least one first guiding element, with which a correctly positioned arrangement of the dragging element in the adjustment unit and thus also in the base element is realizable. It may be preferred that the dragging element comprises an additional second guiding element. The first guiding element is longer than the second guiding element. Due to the different lengths of the guiding elements, which may extend from the second ring of the dragging element in direction of the first ring of the dragging element, an automatic feeding of the dragging element within a manufacturing process is realizable. In this way, the correctly positioned orientation of the dragging element can be realized when the dragging element is inserted in the threaded sleeve, so that the counter-locking and the transport locking are effective in a pre-assembled condition, where the adjustment unit and the base element are fastened to each other.

In a further embodiment, the supporting element is U-shaped and may comprise two reinforcing beads. In alternative embodiments, the supporting element can be L-shaped or shaped in a different manner. Merely the function is important, particularly ensuring a metal connection between the first and the second metal element, so that the force flux is realized seamlessly through metal. Now, again referring to the U-shaped supporting element, this comprises a bottom with an opening and two legs. At this, the bottom may be wider than an outer diameter of the second metal element. The supporting element and the second metal element are arranged in direct contact with each other, wherein the openings are aligned with each other. The reinforcing beads in the transition area between the bottom and the legs ensure that a pre-tension force is directly transferred to the face of the second metal element. Especially for a design of the supporting element with a bottom wider than an outer diameter of the second metal element, a plastic overmolding is advantageous, since an outward bending of the supporting element can be prevented.

A first component is given in combination with an embodiment of the above-described tolerance compensation arrangement, wherein the tolerance compensation arrangement is screwed in the first component. For this purpose, the tolerance compensation arrangement may comprise an outer thread on the base element. The first component in combination with the tolerance compensation arrangement comprises the above-described advantages of the tolerance compensation arrangement, so that it is referred to the corresponding explanations.

A first and a second component are fastened to each other via an embodiment of the above-described tolerance compensation arrangement and by means of a fastening screw. The fastening screw may consist of metal, especially of steel. In this way, also the second thread pairing of the second thread direction represents a metal-metal-connection. The components fastened to each other also comprise the above-described advantages of the tolerance compensation arrangement, so that it is also referred to the corresponding explanations.

A manufacturing method of a base element of the above-described tolerance compensation arrangement comprises the following steps: providing a first and a second metal element as well as a supporting element, arranging the second metal element adjacent to one end of the supporting element, such as adjacent to a bottom of a U-shaped supporting element, wherein an opening in the bottom of the supporting element is aligned with an opening of the second metal element, and embedding or overmolding of the arrangement with a plastic, so that subsequently, a base element is provided having a rigidly arranged second metal element and supporting element. In this way, the above-described base element can be manufactured, so that it is referred to the above explanations with regard to the consequential advantages.

A manufacturing method for the above-described embodiments of the tolerance compensation arrangement comprises the following steps: providing a base element, which comprises a first metal element with a first inner thread, a second metal element with a second inner thread as well as a supporting element made of metal, which may be of the base element according to the above-described manufacturing method, providing an adjustment unit, which comprises a threaded sleeve made of metal with an outer thread and a dragging unit, then screwing the threaded sleeve in the first metal element, wherein the outer thread forms a first thread pairing of a first thread direction with the first inner threading of the first metal element of the base element. With the tolerance compensation arrangement manufactured, the above-described advantages of the tolerance compensation arrangement are realizable. In this regard, it is again referred to the respective explanations. Screwing the threaded sleeve in the first metal element may be carried out in such a manner that a defined projection of the threaded sleeve is present beyond the first metal element. The defined projection depends on the length of the dragging unit, especially of the dragging element, as later described. The screwing in, in at least some embodiments, is carried out in such a manner that if a first and/or second projection is present on the dragging element, the counter-locking and/or the transport locking must be able to fulfil their function.

In a further embodiment of the manufacturing method, the step of providing a base element comprises an arrangement of the first metal element adjacent to a first end of the base element, may be by means of inserting the first metal element in the base element via a first lateral opening of the base element. Especially by means of this arrangement a floating arrangement of the first metal element within the base element is realized, as described above.

In a further embodiment, the step of providing the adjustment unit comprises a providing of the threaded sleeve and a dragging unit comprising an abutting disc, which may be metal, and a dragging element, which may be plastic. In a further embodiment, the manufacturing method comprises the further step of pressing the dragging element into the threaded sleeve which is screwed into the first metal element, so that a first side of an abutting disc is flush with a first end of the dragging element and a second side of the abutting disc opposite to the first side abuts the threaded sleeve. In this context it is referred to the above explanations of the construction of the tolerance compensation arrangement, from which the corresponding advantages arise.

According to a further embodiment, the dragging element comprises a first radially outwardly protruding protrusion which, after the pressing-in of the dragging element, is arranged adjacent to a radially inwardly protruding protrusion of the base element, so that a counter-locking is formed. In a second embodiment, the dragging element comprises at least a second radially outwardly protruding protrusion which, after the pressing-in of the dragging element in an aperture or a recess of the base element, is arranged so that a transport locking is formed. Regarding the functioning of the respective lockings, it is also referred to the explanations of the tolerance compensation arrangement.

4. BRIEF DESCRIPTION OF THE ACCOMPANYING DRAWINGS

In the following, the present disclosure is discussed in detail with reference to the drawings. There, same reference in the drawings indicate same components and/or element. It shows:

FIG. 2 a sectional view of the embodiment according to FIG. 1 along the line A-A, FIG. 3 an exploded view of an embodiment of a base unit of a tolerance compensation arrangement, FIG. 4 a view of an embodiment of the supporting element and the second metal element, FIG. 5 an exploded view of an embodiment of the base unit and the adjustment unit without a plastic coating of the base unit, FIG. 6 a perspective view of an embodiment of the tolerance compensation arrangement without a plastic coating of the base unit, FIG. 7 a schematic procedure of an embodiment of a manufacturing method for a base unit of an embodiment of the tolerance compensation arrangement, and FIG. 8 a schematic procedure of an embodiment of a manufacturing method of an embodiment of the tolerance compensation arrangement.

5. DETAILED DESCRIPTION

In the following, an embodiment of a tolerance compensation arrangement 1 is discussed in detail. A tolerance compensation arrangement 1 refers to an arrangement for fastening a first component 11 (FIG. 2) at a second component 15 (FIG. 2) with automatic or self-acting compensation of tolerances in the spacing between the first and the second component.

Figure 1:
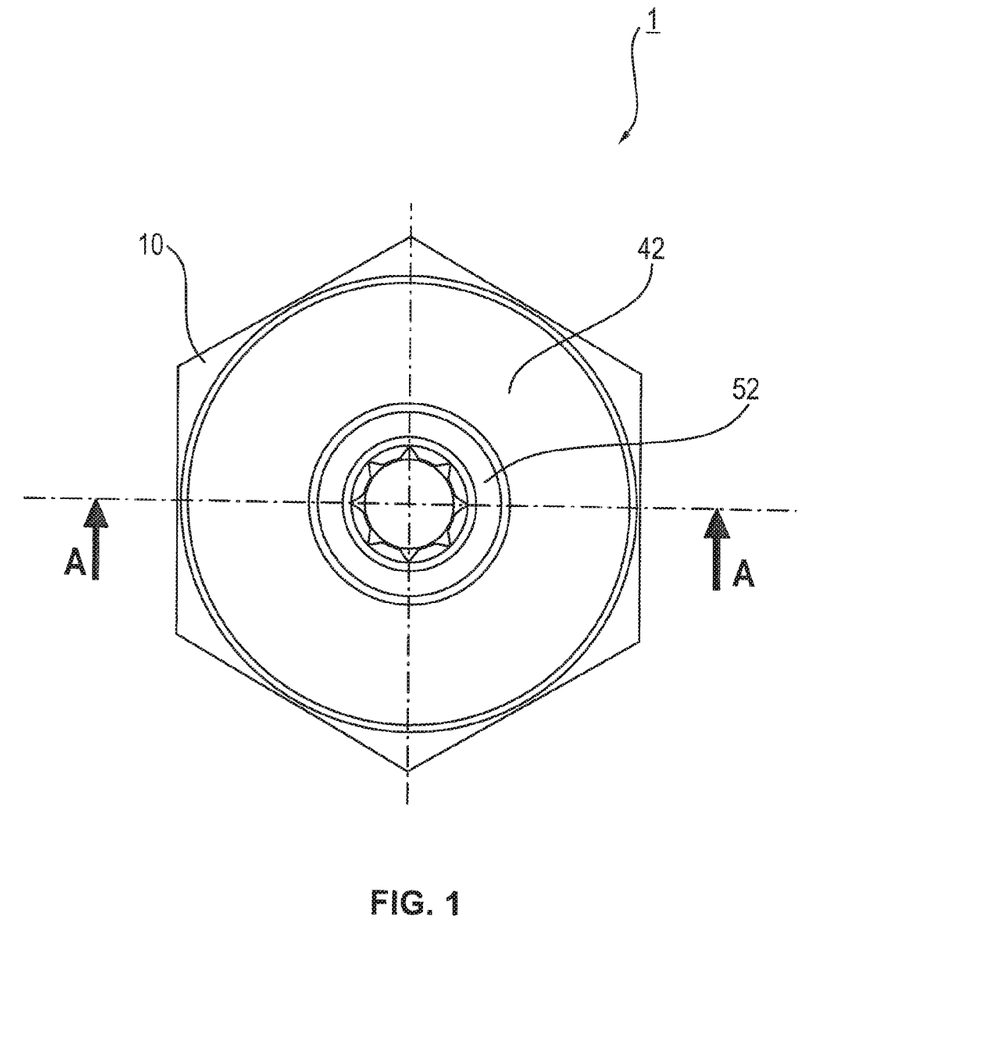
FIG. 1 a top view of an embodiment of the tolerance compensation arrangement.
Figure 4:
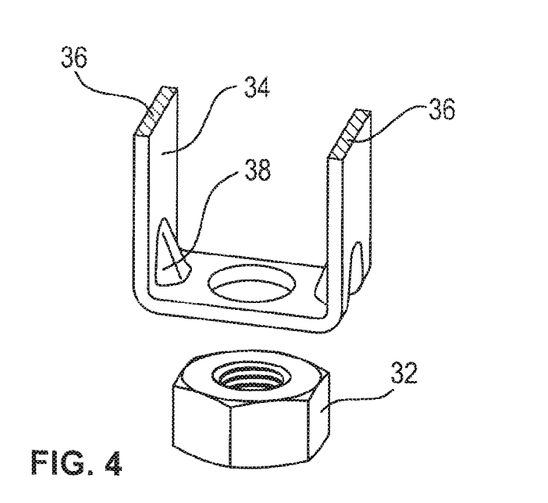
Figure 5:
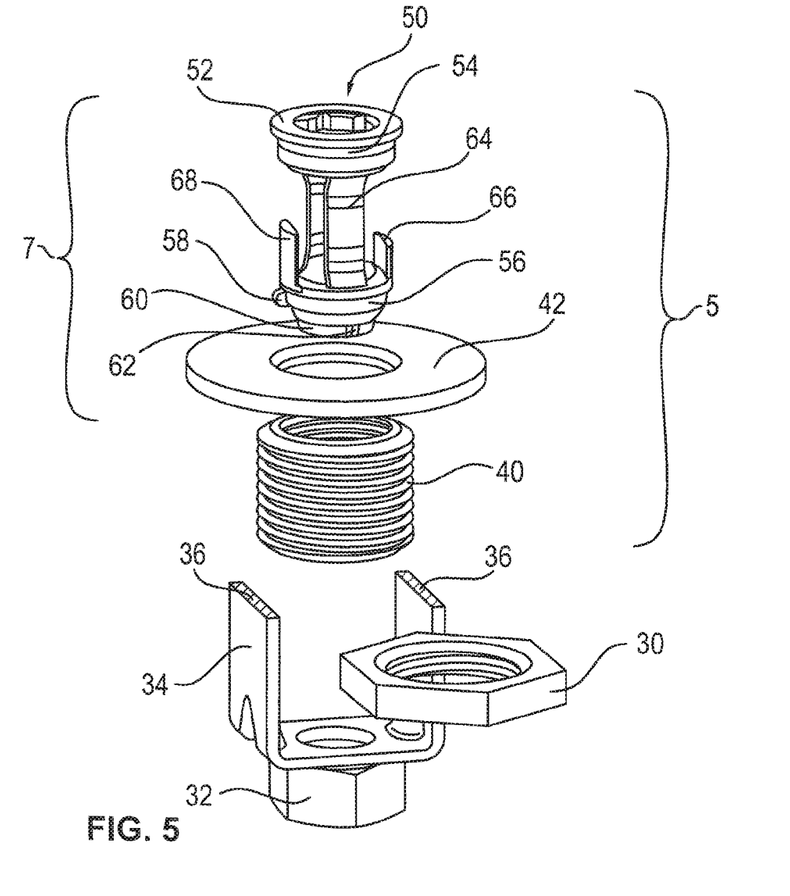

Referring to the FIGS. 1 and 5, the tolerance compensation arrangement 1 consists of a base unit and an adjustment unit 5. The adjustment unit 5 comprises a threaded sleeve 40 with an outer thread and a dragging unit 7. The embodiment of tolerance compensation arrangement 1 is further discussed with reference to FIGS. 1 to 6.

The base unit consists of four elements or components, particularly the base element 10, a first metal element 30 with a first inner thread, a second metal element 32 with a second inner thread as well as a supporting element 34 made from metal. The supporting element 34 is arranged between the first metal element 30 and the second metal element 32 and ensures a seamless force flux through metal from the first metal element 30 to the second metal element 32. The base element 10 may consist of plastic and is manufactured for example by injection molding. During the manufacturing of the base element 10, at least the supporting element 34 is overmolded and thus forms a unit with the base element 10. This may also be applicable to the second metal element 32. In a special embodiment, also the first metal element is overmolded directly. Thus, the finished base unit consists of one to three individual components, and in some embodiments is two individual components, in particular the base element 10 with the second metal element 32 and supporting element 34 on the one side and the separate first metal element 30 on the other side. The first 30 and the second metal element 32 are nuts with a substantially hexagonal outer shape. Adjacent to the respective opening, the first 30 and the second metal element 32 comprise a chamfer on both sides, respectively. The present chamfer on both sides on the first 30 and second metal element 32 ensures that especially at an automatic supply of the metal elements 30, 32, a correctly positioned orientation must not be taken into account. In a further embodiment, the chamfer can be intended to be on only one side of the respective metal element 30, 32. Here, a correctly positioned orientation must be taken into account. This means that the chamfer must be arranged at the top at the inserting of the respective metal element 30, 32, thus the chamfer must be facing the first end of the base element 10.

Figure 6:
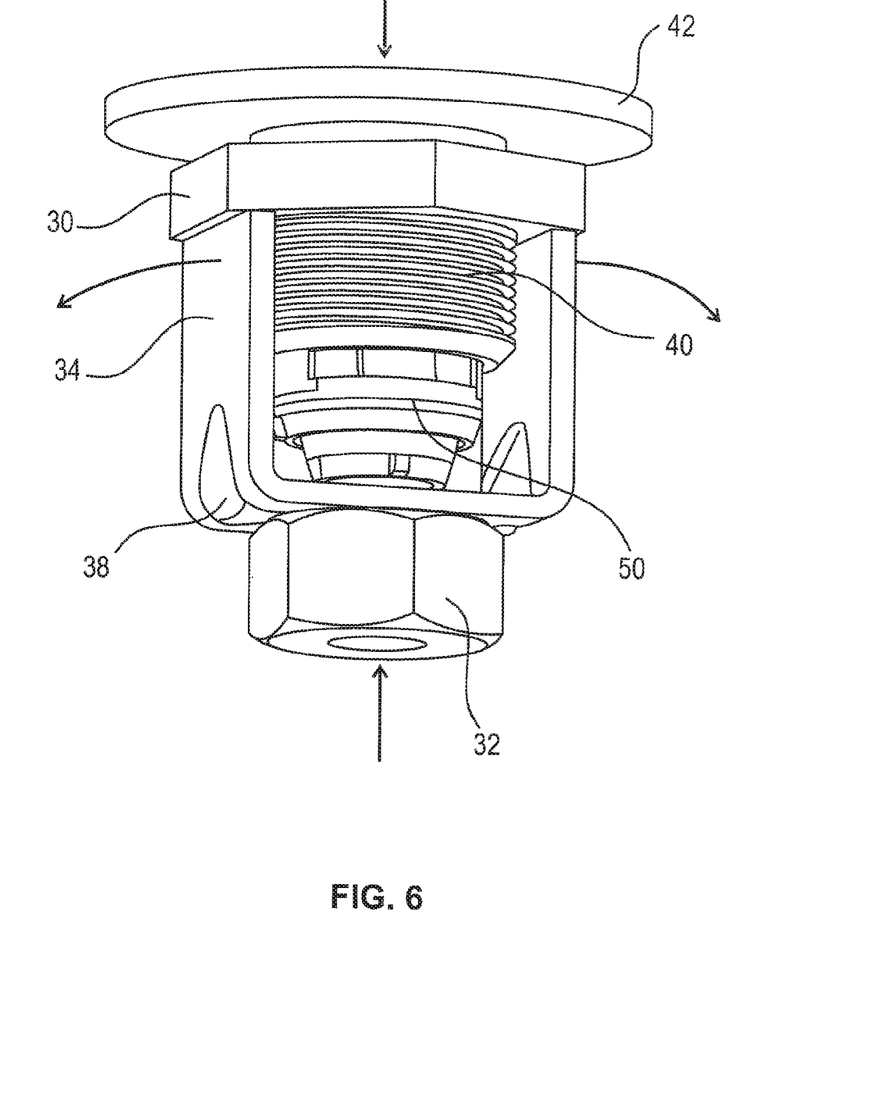

As shown in FIGS. 4 to 6, the supporting element 34 is U-shaped and comprises two reinforcing beads 38. In alternative embodiments, the supporting element can be L-shaped or shaped in a different manner. Merely the function is important, particularly ensuring a metal connection between the first 30 and the second metal element 32, so that the force flux is realized seamlessly through metal. Now, again referring to the U-shaped supporting element 34, this comprises a bottom with an opening and two legs. The upper ends of the legs provide seating areas 36 for the first metal element 30, while the bottom functions as a contact area for the second metal element 32. At this, the bottom may be wider than an outer diameter of the second metal element 32. The supporting element 34 and the second metal element 32 are arranged in direct contact with each other, wherein the openings are aligned with each other. The reinforcing beads 38 in the transition area between the bottom and the legs ensure that a pre-tension force is transferred directly to the face of the second metal element 32. As especially indicated by the arrows in FIG. 6, for a design of the supporting element 34 with a bottom wider than an outer diameter of the second metal element 32, a plastic overmolding, thus an embedding in the base element 10, is advantageous, since an outward bending of the supporting element 34 due to an external force applied from above or from below on the tolerance compensation arrangement 1 can be prevented.

Figure 2:
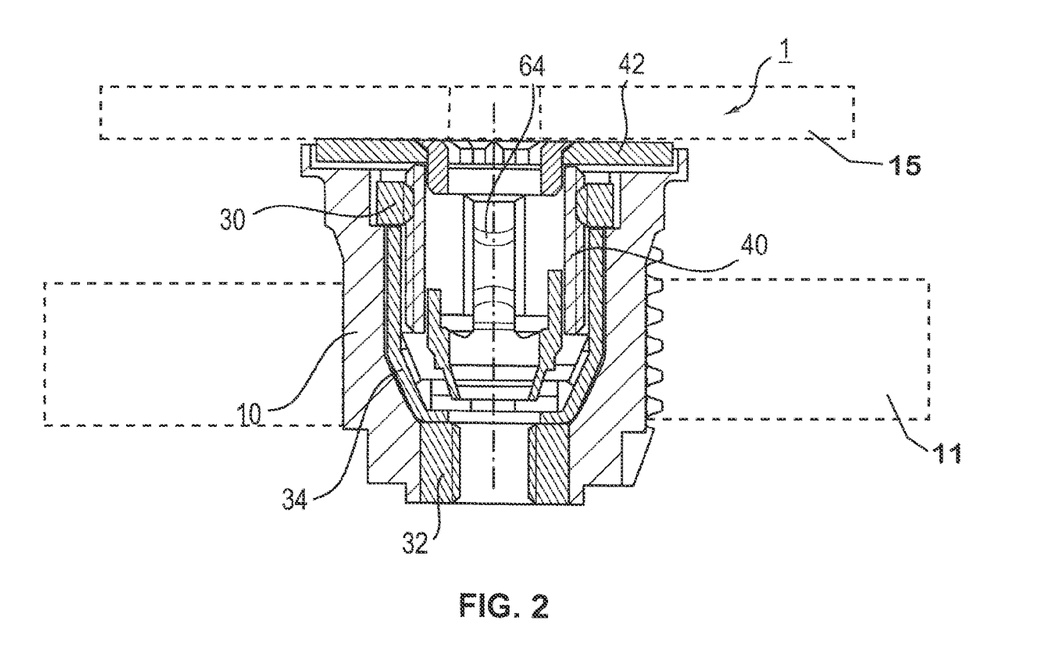
Figure 3:
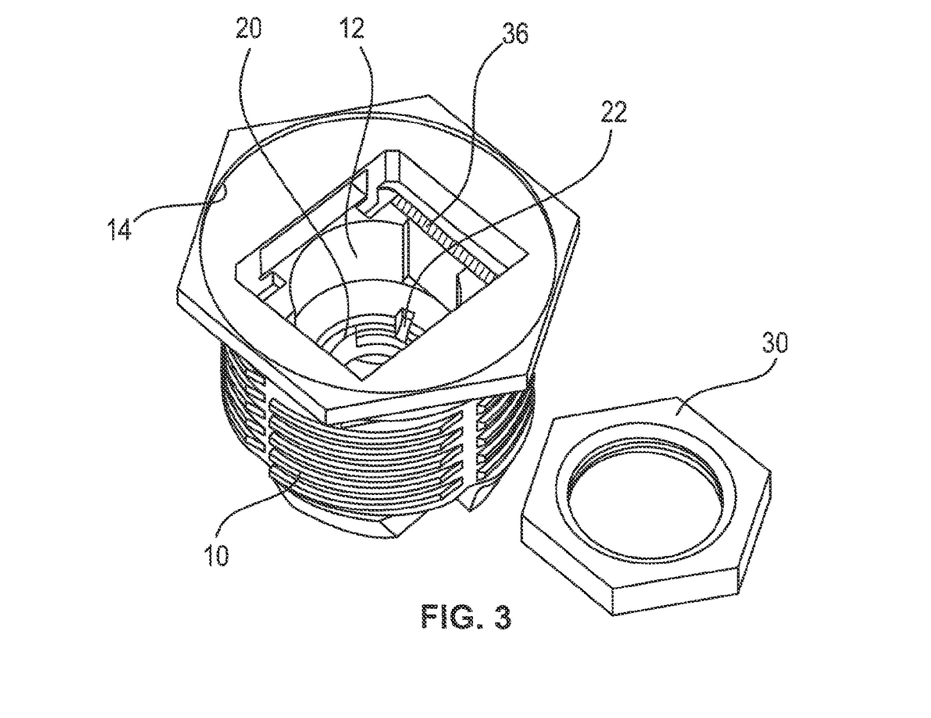

The base element 10, comprises, as clearly apparent from the FIGS. 2 and 3, a bore 12 along its longitudinal axis. The bore 12 defines a passage for a fastening screw when using the tolerance compensation arrangement. Further, the base element 10 comprises a first lateral opening adjacent to a first or upper end of the base element 10. The first lateral opening is dimensioned such that the first metal element 30 can be inserted, especially slid in, through the first opening. If the second metal element has not been overmolded during the manufacturing of the base element 10, then the base element 10 may comprise a second lateral opening adjacent to a second or lower end of the base element 10. Through the second lateral opening, the second metal element 32 can be inserted into the base element 10. The first and the second lateral opening may be spaced from each other axially along the longitudinal axis of the base element 10 and arranged centered over each other. In particular, a straight line extends parallel to the longitudinal axis of the base element 10 from the geometrical center of the openings.

In the embodiment shown in FIGS. 2 and 3, the first lateral opening is arranged such that the first metal element 30, when inserted, simultaneously comes into contact with two seating areas 36 provided by the supporting element 34. Referring to the above-discussed U-shaped supporting element 34, the first lateral opening is not arranged on the same side of the base element 10, where one of the legs of the U-shape is located, but rectangular to the U-shape.

In the inside of the base element 10, the first metal element 30 and the second metal element 32 are retained rotationally fixed. In order to realize this rotationally fixed retaining, the base element 10 comprises a respective inner contour in the area of the first lateral opening 16. Above the area of the first lateral opening, an area with a cut-out 14 is provided and is arranged such that, one the one hand, it can receive an abutting disc 42 and on the other hand it limits a movement of the first metal element 30 in direction of the first end of the base element 10. Due to this arrangement in the inside of the base element 10, the first metal element 30 is floatingly arranged in the base element 10, as further discussed below.

Since the second metal element 32 has been directly overmolded with the plastic of the base element 10, it is also torque-proof arranged therein. If the second metal element 32 should be inserted alternatively via the second lateral opening, then, there as well, a respective inner contour of the base element 10 ensures a rotationally fixed arrangement of the second metal element 32. The second metal element 32 is in particular pressed into the base element 10 via the second lateral opening and is thus not floatingly arranged in at least some embodiments.

The inner contour of the base element 10 is further discussed with reference to FIG. 3. The base element 10 comprises a first inner diameter adjacent to the first end, in particular below the first lateral opening 16, which is dimensioned in the height, thus along the longitudinal axis of the base element 10, such that the threaded sleeve 40 can almost completely be arranged therein. The area with the first inner diameter transitions from a first step into a first conical area. In this first conical area, a first radially inwardly protruding protrusion is provided, the function of which will be discussed later.

The first conical area transitions via a second step into a second conical area. The second conical area comprises the apertures or recesses 20, the function of which will also be discussed later. Instead of the apertures 20, grooves, recesses or the like can be provided. The area with the second metal element 32 or with the inner contour adjusted to the second metal element 32 joints the second conical area. Optionally, and depending on whether or not the second metal element 32 is designed self-lockingly, adjacent to the second end, an area with a second inner diameter follows, the latter being reduced when compared to the first inner diameter. The second inner diameter is in particular dimensioned such that it provides a locking against self-releasing for a fastening screw screwed therein. Thus, the second inner diameter is not only smaller than the first inner diameter but in particular not larger than the inner diameter of the second metal element 32.

Regarding the outer design of the base element 10, the latter comprises adjacent to the first end a hexagonal outer shape and adjacent to the second end, for example, a rectangular shape with rounded corners. In the middle area, the base element 10 is round and equipped with an outer thread. The outer thread of the base element 10 serves as fastening in a first component, especially by means of screwing in, wherein the hexagonal area adjacent to the first end provides a screwing-in-limitation as well as an engagement feature for a tool for screwing in.

As previously discussed, the adjustment unit comprises the dragging unit 7 and the threaded sleeve 40 made of metal, especially steel. The components of the adjustment unit 5 are discussed in the following with reference to FIG. 5. As FIG. 5 shows, the threaded sleeve 40 with outer thread comprises a chamfer at its ends, respectively. The outer thread of the threaded sleeve 40 forms the first thread paring of the first thread direction with the inner thread of the first metal element 30. For example, the first inner thread and the outer thread of the threaded sleeve 40 are left-hand threads.

The dragging unit 7 comprises an abutting disc 42 and a dragging element 50. The abutting disc 42 comprises a chamfer at its inner edge, respectively. The dragging element 50 comprises at the first end a first ring 52 with crushing segments 54 and at a second end a second ring 56. The first 52 and the second ring 56 are for example connected with each other via two dragging webs 64, which project springily radially inwardly and thereby taper a passage for the fastening screw. In this way, the dragging of the adjustment unit 5 for a later use is realized.

A first guiding section 66 as well a second guiding section 68 may extend vertically from the second ring 56 in direction of the first ring 54. Here, the first guiding section 66 is formed shorter than the second guiding section 68. With the two guiding sections 66 and 68, a correctly positioned assembly of the dragging element 50 in the tolerance compensation arrangement 1 is realizable, especially for an automatic manufacturing method. Further, the second ring 56 comprises a first radially outwardly protruding protrusion 58. In the initial state of the tolerance compensation arrangement 1, this first protrusion 58 acts together with the first protrusion 22 of the base element 10. The necessity of the two protrusions 58 and 22 in at least some embodiments arises from the fact that the threads of the threaded sleeve 40 and the first metal element are manufactured by a cutting procedure. When compared to plastic manufacturing of the components, the providing of an end stop of the respective threads is thus not possible. In order to still realize a counter-locking and thus to especially prevent a countering of the threaded sleeve 40 within the first metal element 30, the two protrusions 58 and 22 acting together are provided. The two protrusions 58 and 22 are dimensioned such that, when the adjustment unit 5 is rotated back, the first protrusion 58 of the dragging element 50 safely fastens against the first protrusion 22 of the base element 10 with a sufficient covering. At the same time, the dimensioning is such that, when the adjustment unit 5 is screwed out after a rotation, the first protrusion 58 of the dragging element 50 can pass the first protrusion 22 of the base element 10 contact-free. At the manufacturing of the tolerance compensation arrangement 1, a correctly positioned assembly of the adjustment unit 5 or the dragging unit 50 is especially important, and is performed in such a way, that the two protrusions 58 and 22 are arranged adjacent to each other after the manufacturing.

The dragging element 50 comprises a third ring 60 with two second radial protrusions 62, the function of which is also discussed later. The two second radial protrusions are arranged at opposite sides of the third ring 60. The first protrusion 58 of the second ring 56 may be arranged centered between the two second protrusions 62 of the third ring 60. The third ring 60 is connected via webs with the second ring 56 at the side facing away from the first ring 52. Additionally, the third ring 60 is oval-shaped, so that when the fastening screw is driven through, the second radially outwardly protruding protrusions 62 of the dragging element 50 are unlockable by a radially inwardly directed deformation movement. In a completely screwed in state of the adjustment unit 5 in the base element 10, the two protrusions 62 of the dragging element 50 are engaged with the recesses 20 of the base element 10. In this way, the two protrusions 62 form a transport locking with the recesses 20 of the base element 10, especially against rotation. In this state, the first protrusion 58 of the dragging element 50 is also arranged adjacent to the first protrusion 22 of the base element 10.

In an assembled state of the adjustment unit 5, an upper side of the first ring 52 is flush with the first side of the abutting disc 42. The second side of the abutting disc 42 abuts with the threaded sleeve 40, as exemplarily shown in FIG. 2. Here, FIG. 2 shows a sectional view of an embodiment of the tolerance compensation arrangement 1. The abutting disc 42 is held by means of the crushing segments 54 at the first ring 52 of the dragging element 50.

Figure 7:
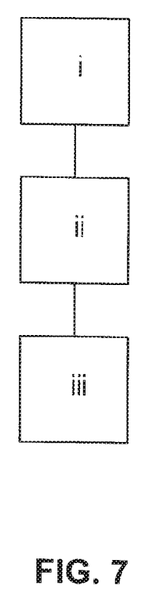

FIG. 7 shows a schematic procedure of a manufacturing course for an above-described base element with an embedded second metal element 32 and supporting element 34 made of metal. For this, initially, the first 30 and the second metal element 32 as well as the supporting element 34 are provided (step i). Then, the second metal element 32 is positioned adjacent to one end of the supporting element 34, may be adjacent to a bottom of a U-shaped supporting element 34 (step ii). Thereby, an opening in the bottom of the supporting element 34 is aligned with an opening of the second metal element 32. Subsequently, the embedding or overmolding of the arrangement with a plastic takes place, so that subsequently a base element 10 is present having a rigidly arranged second metal element 32 and a supporting element 34 (step iii).

Figure 8:
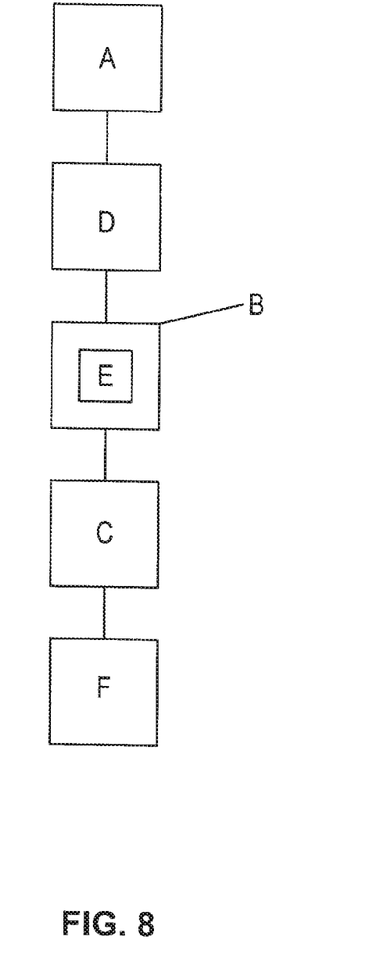

In the following, and with reference to FIG. 8, the manufacturing method of the tolerance compensation arrangement is discussed. First, the base element 10 is provided with the first 30 and the second metal element 32 (step A). Here, it may be a base element 10, that has been manufactured as already described above, thus has a firmly embedded second metal element 32 and a supporting element 34. Then, the first metal element 30 is inserted or slid in into the base element 10 (step D). The first metal element 30 is thereby floatingly arranged in the base element 10, especially with lateral tolerance. Due to the floating arrangement of the first metal element 30 it is ensured that the complete adjustment unit, comprising the threaded sleeve 40 as well as the dragging element 50 and the abutting disc 42, is also floatingly arranged. Thus, a screwing out without jamming of the adjustment unit 5 is possible even with radial displacement of the fastening screw.

Further, the adjustment unit 5 is provided with the dragging unit 7 and the threaded sleeve 40 (step B). The dragging unit 7 may be provided with the separate components dragging element 50 and abutting disc 42 (step E).

Now, the threaded sleeve 40 is screwed into the first metal element 30 in the base element 10. According to the above example, there are left-hand threads forming the first thread pairing of the first thread direction. During the screwing in, a defined height is exactly met, so that the first protrusion 58 and the second protrusions 62 of the dragging element 50 can act together correctly with the corresponding counter-parts, hence the first protrusion 22 and the recesses 20 of the base element 10 after the manufacturing of the tolerance compensation arrangement 1. The required height thus arises from the previously described way of function and depends on the dimensions of the individual components of the tolerance compensation arrangement 1. Due to the co-acting of the outer thread of the threaded sleeve 40 made of metal with the inner thread of the first metal element 30, a greater strength is achievable, wherein due to the use of a base element 10 made of plastic, a cost-effective tolerance compensation arrangement is provided when compared to a tolerance compensation arrangement manufactured entirely from metal.

After the screwing in of the threaded sleeve 40, the abutting disc 42 is connected with the threaded sleeve 40 by correctly positioned pressing-in of the dragging element 50 (step F). The pressing-in of the dragging element 50 is performed with a flat die, which has a larger diameter than the first ring 52 of the dragging element 50. In this way, the upper end of the dragging element 50 and the first side of the abutting disc 42 are not only arranged parallel, but also on the same height, hence flush with each other. This is necessary, in at least some embodiments so that the counter-locking and the transport locking can function properly. By means of the crushing segments 54, a firm seating of the abutting disc 42 at the first ring 52 is realized.

Correctly positioning of the dragging element 50 means in this context that at the end of the pressing-in, hence when the first ring is flush with the abutting disc 42, the first protrusion 58 of the dragging element 50 is arranged adjacent to the first protrusion 22 of the base element 10 and the second protrusions 62 are arranged in the recesses 13. The first protrusion 58 of the dragging element 50 forms the counter-locking with the first protrusion 22 of the base element 10, while the second protrusions 62 in the recesses 13 form the transport locking against rotation.

If the above method is performed automatically, especially the feeding of the dragging element 50, then the correctly positioned orientation can be ensured due to the first 66 and the second guiding element 68, which have different lengths and thus can prevent an installation of the dragging element 50 twisted by 180°.

The invention claimed is:

1. Tolerance compensation arrangement for fastening a first component to a second component with automatic compensation of tolerances in the spacing between the first and the second component, comprising the following features:
   a. a base unit which comprises a base element, a first metal element with a first inner thread and a second metal element with a second inner thread as well as a supporting element arranged between the first and the second metal element, wherein the first and the second metal element are spaced from each other along a longitudinal axis of the base element, wherein the first and the second metal element are in contact with the supporting element, and wherein the base element comprises a first end with a first inner diameter and an opposite second end with a second inner diameter being smaller than the first inner diameter, wherein the first metal element is arranged adjacent to the first end and the second metal element is arranged to the second end, and b. an adjustment unit which comprises a threaded sleeve made of metal with an outer thread and a dragging unit at least partially arranged in the threaded sleeve, wherein the outer thread forms a first thread pairing of a first thread direction with the first inner thread of the first metal element of the base element, wherein c. a fastening screw, which is insertable through an opening of the base unit and the adjustment unit, can be screwed into the second inner thread of the second metal element of the base unit via a second thread pairing of a second thread direction opposite to the first thread direction and can be connected to the adjustment unit via the dragging unit through a releasable dragging connection so that, during the rotation of the fastening screw, the adjustment unit co-rotates and is thereby moved into abutment with the first component.

2. The tolerance compensation arrangement according to claim 1, in which the base element at least partially surrounds the first and the second metal element in such a manner, that the first and the second metal element in the base element are arranged rotationally fixed.

3. The tolerance compensation arrangement according to claim 1, in which the first metal element is floatingly arranged in the base element, so that a misalignment of the fastening screw during insertion into the adjustment unit can be compensated.

4. The tolerance compensation arrangement according to claim 1, in which the base element comprises a first lateral opening for the receiving of the first metal element.

5. The tolerance compensation arrangement according to claim 1, in which the first and the second metal element are a first and a second nut.

6. The tolerance compensation arrangement according to claim 1, in which the dragging unit comprises a dragging element as well as an abutting disc, wherein the dragging element is retained in the threaded sleeve by means of a press-fit.

7. The tolerance compensation arrangement according to claim 6, in which the dragging element comprises a first and a second axial end, wherein the first axial end is arranged flush with a first side of the abutting disc and a second side of the abutting disc opposite to the first side abuts with the threaded sleeve.

8. The tolerance compensation arrangement according to claim 7, in which the dragging element comprises a first radially outwardly protruding protrusion adjacent to the second axial end and the base element comprises a first radially inwardly protruding protrusion, which together form a counter-locking.

9. The tolerance compensation arrangement according to claim 8, in which the dragging element comprises at least a second radially outwardly protruding protrusion adjacent to the second axial end and the base element comprises at least one recess, which together form a transport locking.

10. The tolerance compensation arrangement according to claim 6, in which the dragging element comprises at least one first guiding element, with which an arrangement of the dragging element in the adjustment unit and thus also in the base element is realizable.

11. The tolerance compensation arrangement according to claim 1, wherein the supporting element is U-shaped.

12. A first component in combination with a tolerance compensation arrangement according to claim 1, wherein the tolerance compensation arrangement is screwed into the first component.

13. A first and a second component, which are fastened to each other via the tolerance compensation arrangement according to claim 1 and by means of the fastening screw.

14. Manufacturing method for a tolerance compensation arrangement according to claim 1, comprising the following steps:

a. providing a base unit which comprises a base element, a first metal element with a first inner thread, a second metal element with a second inner thread as well as a supporting element made of metal, wherein the first and the second metal element are spaced from each other along a longitudinal axis of the base element, wherein the first and the second metal element are in contact with the supporting element, and wherein the base element comprises a first end with a first inner diameter and an opposite second end with a second inner diameter being smaller than the first inner diameter, wherein the first metal element is arranged adjacent to the first end and the second metal element is arranged adjacent to the second end, b. providing an adjustment unit, which comprises a threaded sleeve made of metal with an outer thread and a dragging unit at least partially arranged in the threaded sleeve, then c. screwing the threaded sleeve into the first metal element, wherein the outer thread forms a first thread pairing of a first thread direction with the first inner threading of the first metal element of the base element, wherein a fastening screw, which is insertable through an opening of a base unit and the adjustment unit, can be screwed into the second inner thread of the second metal element of the base unit via a second thread pairing of a second thread direction opposite to the first thread direction and can be connected to the adjustment unit via the dragging unit through a releasable dragging connection so that, during the rotation of the fastening screw, the adjustment unit co-rotates and is thereby moved into abutment with the first component.

15. The manufacturing method according to claim 14, wherein the step of providing the adjustment unit comprises:

e. providing the threaded sleeve and a dragging unit comprising an abutting disc, and a dragging element.

16. The manufacturing method according to claim 14, with the further step:

f. pressing the dragging element into the threaded sleeve which is screwed into the first metal element, so that an abutting disc with a first side is flush with a first end of the dragging element and is with a second side opposite to the first side in contact with the threaded sleeve.

17. The manufacturing method according to claim 14, wherein the dragging element comprises a first radially outwardly protruding protrusion which, after the pressing-in of the dragging element, is arranged adjacent to a radially inwardly protruding protrusion of the base element, so that a counter-locking is formed.

18. The manufacturing method according to claim 14, wherein the dragging element comprises at least a second radially outwardly protruding protrusion which, after the pressing-in of the dragging element into a recess of the base element, is arranged so that a transport locking is formed.

* * * * *